United States Patent [19]
Brookes

[11] 3,949,238
[45] Apr. 6, 1976

[54] DISTRIBUTED POWER SWITCH FOR MODULAR SYSTEMS

[75] Inventor: Barry Edward Brookes, Ottawa, Canada

[73] Assignee: Northern Electric Company, Limited, Montreal, Canada

[22] Filed: Jan. 13, 1975

[21] Appl. No.: 540,600

[52] U.S. Cl. ................................. 307/64; 307/23
[51] Int. Cl.² ........................................ H02H 3/28
[58] Field of Search ............ 307/23, 29, 18, 11, 64, 307/66

[56] References Cited
UNITED STATES PATENTS
3,440,492   4/1969   Carmody ............................. 307/23

Primary Examiner—Herman J. Hohauser
Attorney, Agent, or Firm—Frank Turpin

[57] ABSTRACT

Power is fed from a pair of power supplies to each one of a plurality of load circuits through a distributed power switch. A plurality of switch means are each associated with a respective one of the load circuits for connecting it to one of the power supplies in a primary manner and to the other power supply in a secondary manner. Upon failure of its primary source of power, each switch means is effective for automatically connecting its load circuit to its secondary source of power.

5 Claims, 1 Drawing Figure

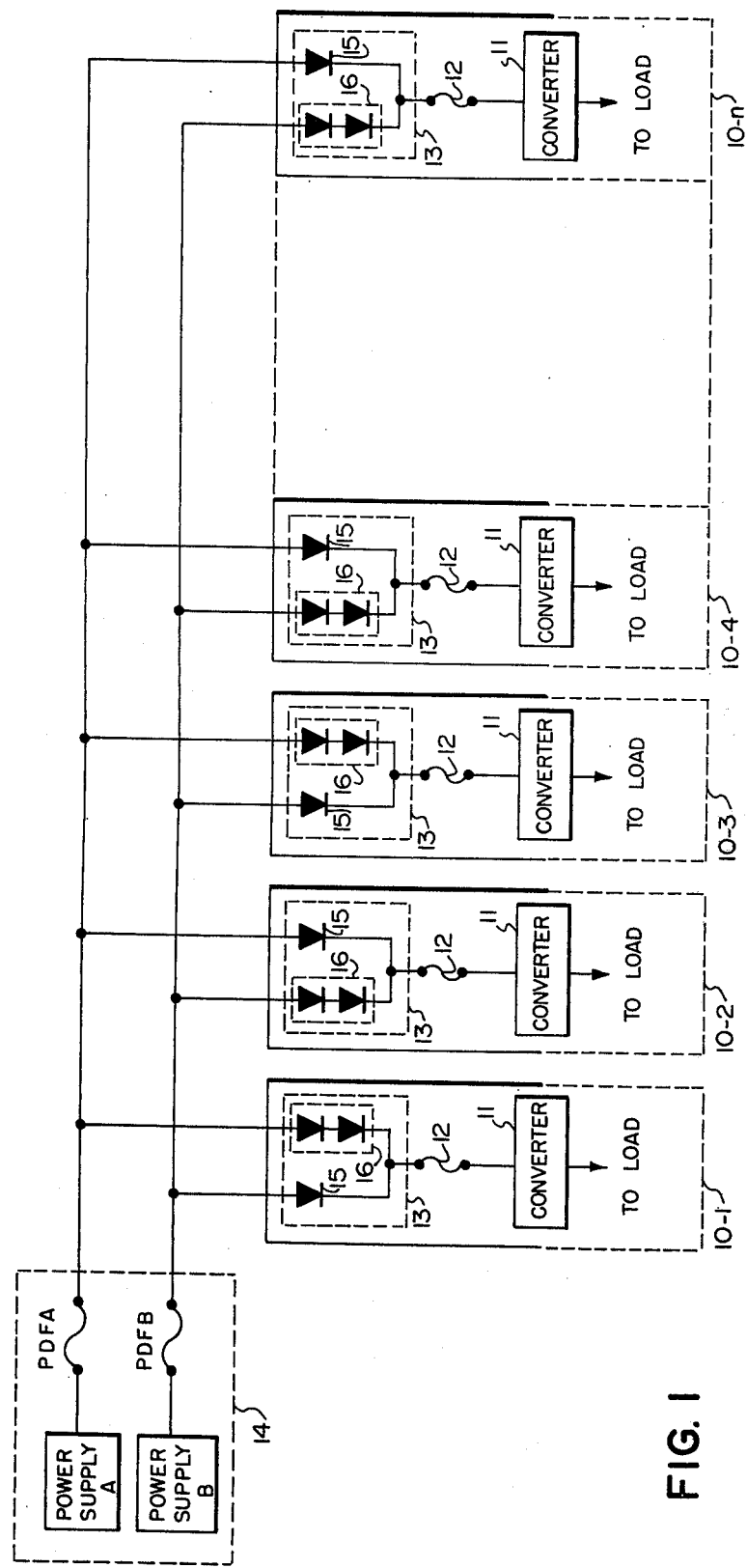
FIG. I

DISTRIBUTED POWER SWITCH FOR MODULAR SYSTEMS

This invention relates generally to power supplies and more particularly to a power distribution system for modular apparatus.

The electrical power necessary to the functioning of electrical equipment such as a telephone system is normally provided by power supply apparatus located at a central source such as a power distribution frame. In the last few years, switching systems using electronic circuits have been designed to replace or augment the capability of existing electromechanical systems and for economic reasons and ease of maintenance, many of these systems tend to be modularized. For example, a shelf of equipment may consist of a plurality of identical printed circuit boards or modules, each one being capable of providing an independent switching function. Whenever a new switching system is installed, the shelf may have only a few modules and when it is desired to extend the capability of the system, it is only necessary to add more modules.

One of the prime considerations in the design of an electronic system is reliability, and the weak link in this consideration is often the power distribution to the system. Attempts at solving this problem has resulted in the development of a number of concepts.

For example, some of the recently developed electronic switching systems use a fully duplicated system wherein each part thereof is equipped with its own power supply system. If one part of the system fails, its duplicate part is switched on-line. This type of system tends to be very reliable; however the cost of achieving this level of reliability is also very high.

Other systems provide a duplicated power supply system wherein a pair of power supplies are connected to the electronic system through a power switch. One of the supplies is active while the other one is on standby. In the event that the active supply should fail, the standby supply may be switched on-line through the power switch. However, this type of system suffers from major disadvantages. Because the power switch must commutate a large amount of current, its switching time is relatively slow in comparison to the electronic circuitry to which it is supplying power. In addition, the complexity of such a power switch also makes it fairly expensive. This system suffers from still another problem in that the reliability of the entire system is based in part on a single power switch. In fact, the reliability of a single power supply is traded for the reliability of a single power switch. For these reasons, this type of power distribution system is not found in many systems.

This invention provides a power distribution system which has the advantages of a fully duplicated system without providing such a system and without suffering from the problems of an unduplicated system with duplicated power supplies.

In accordance with the invention, there is provided a power distribution system wherein the power from duplicated supplies is fed to the parts of a modular system through a distributed power switch. That is, each of a plurality of loads is connected through a respective switch to one of the power supplies in a primary manner and to the other of the power supplies in a secondary manner. In the event of failure of the primary source of power to any one load, the switch associated with that load is effective to automatically connect it to its secondary source of power.

Generally each circuit load is connected to one of the power supplies through a first respective impedance element having a first predetermined value and to the other power supply through a second respective impedance element having a second predetermined value which is larger than said first value. In one embodiment of the invention each switch may be a pair of diodes having different characteristics.

This system exhibits marked advantages over prior art systems. For example, since each switch is associated with only one circuit load, the current to be switched is relatively low and the switch-over speed is very fast. In addition, the simplicity of the distributed switch makes it very attractive economically and enhances the reliability of the entire system. For example, if one of the power supplies fail, none of the load circuits is affected and if one of the plurality of the circuit load causes one of the supplies to fail, only that one circuit load is affected.

An example embodiment of the invention will now be described in conjunction with the drawing which is a schematic diagram of a power distribution system in accordance with the invention.

The diagram shows a typical modular electronic system embodying a distributed power switch in accordance with the invention. A plurality of circuit modules or printed circuit boards 10-1, 10-2, 10-3, 10-4 to 10-$n$ may each consist of a self-contained sub-system. For example, each module may contain the interface circuitry for a corresponding operator position in a telephone system. Each module has a load circuit to which power is supplied from a converter 11 which normally includes a current and voltage regulator. Each converter 11 is connected to a pair of power supplies A and B through respective fuses 12 and switches 13. The power supplies A and B normally supply unregulated current through respective fuses PDFA and PDFB. These power supplies are conventionally located in a power distribution frame 14.

Each switch 13 comprises a first impedance element having a predetermined value such as diodes 15 connected between the fuse 12 and one of the power supply output terminals. Each switch 13 also comprises a second impedance element having a value greater than the first elements such as a pair of diodes 16. In this case, all of diodes 15 and 16 are of the same type and may conveniently be p-n junction diodes. In an alternative embodiment, diode 15 may be a schottky barrier diode and the pair of diodes 16 may be replaced with a single p-n junction diode.

It may be noted that under some circumstances such as very low current drain, the elements of the switch 13 may be simply resistors. On the other hand, the distributed switch concept may be achieved by designing the switches 13 using other elements such as transistors.

In opeation, it may be observed that each of modules 10-1 to 10-$n$ is connected to one of the power supplies A and B in a primary manner and to the other of power supplies A and B in a secondary manner. For example, module 10-1 is connected in a primary manner to power supply B and in a secondary manner to power supply A. This is because the impedance of diode 15 is less than the impedance of element 16. Similarly, module 10-2 is connected in a primary manner to power supply A and in a secondary manner to power supply B. It may be noted that one half of the total number of modules are connected to one power supply in a primary manner and to the other power supply in a secondary manner. This has the effect of dividing the load between the two power supplies. It may also be noted that the primary and secondary power connections may be varied for alternate modules as shown in the drawing. This tends to equalize the power loss through the distribution leads. In other words, the length of the leads from the power supplies to the module 10-4 are not much longer than the leads from the power supplies to module 10-3. This distribution also provides the advantage that in an expandable modular system, the respective loads on the power supplies are always approximately balanced.

If for example, power supply A fails, modules 10-1 and 10-3 continue to be supplied with power in a primary manner for power supply B. However, the switches 13 of modules 10-2, 10-4 and 10-n which were being supplied in a primary manner from power supply A react by drawing current from power supply B throuth their respective pairs of diodes 16. Power supply B is then supplying power to all the modules. Modules 10-1 and 10-3 are supplied current through a respective single diode 15 and modules 10-2, 10-4 and 10-n, are supplied current through a respective pair of diodes 16. Conversely, if power supply B should fail, the entire load is automatically assumed by power supply A. It should be noted also that the increase in voltage drop across the diodes switch which occurs on a PDF fuse failure, e.g. from one diode drop to two diode drops, is not felt at the load circuit because the normal line regulation of the converter effectively eliminates this voltage charge at its output.

As is evident from the above description, the invention provides a power distribution system exhibiting major advantages over the existing art. The switching from a failed power supply to another is done at each one of a plurality of loads, therefore the amount of current to be switched is very low. This allows the switch to be very simple and therefore very economical. In addition, each of the power supplies is only loaded to half capacity under normal conditions. This enhances their reliability by increasing their expected mean-time-to-failure characteristic.

What is claimed is:

1. In a power distribution system having a pair of input terminals for connection to respective sources of power, and a plurality of output terminals for connection to respective ones of a plurality of circuit loads, a distributed power switch for connecting said input terminals to said output terminals, comprising: a plurality of switch means each one being associated with a respective one of said output terminals for connecting it to one of said input terminals in a primary manner and to the other of said input terminals in a secondary manner, each of said switch means being effective, upon the failure of its primary source of power, for automatically connecting its associated output terminal to its secondary source of power, each of said switch means comprising, a first impedance element having a first predetermined value, said first element being connected between one of said input terminals and the output terminal associated with the switch means, and a second impedance element having a second predetermined value greater than said first value, said second element being connected between the other of said input terminals and said output terminal associated with the switch means.

2. A distributed power siwtch as defined in claim 1 wherein each of said impedance elements includes at least one unidirectional current device.

3. A distributed power switch as defined in claim 2 wherein each of said impedance elements having a first predetermined value is a schottky barrier diode and wherein each of said impedance elements having a second predetermined value is a p-n junction diode.

4. A distributed power switch as defined in claim 2 wherein each of said impedance elements having a first predetermined value comprises a diode of a certain type and wherein each of said impedance elements having a second predetermined value comprises a pair of serially connected diodes of the same type.

5. A distributed power switch as defined in claim 4 wherein each of said diodes is a p-n junction diode.

* * * * *